(12) United States Patent  
Yoon et al.

(10) Patent No.: US 8,520,934 B2
(45) Date of Patent: Aug. 27, 2013

(54) SYSTEM AND METHOD FOR MARKING A STEREOSCOPIC FILM

(75) Inventors: Youngshik Yoon, Cupertino, CA (US); Izzat Izzat, Plainsboro, NJ (US); Dong-Qing Zhang, Plainsboro, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 396 days.

(21) Appl. No.: 12/737,137

(22) PCT Filed: Jun. 13, 2008

(86) PCT No.: PCT/US2008/007508
§ 371 (c)(1),
(2), (4) Date: Dec. 10, 2010

(87) PCT Pub. No.: WO2009/151424
PCT Pub. Date: Dec. 17, 2009

(65) Prior Publication Data
US 2011/0085727 A1 Apr. 14, 2011

(51) Int. Cl.
*G06K 9/00* (2006.01)

(52) U.S. Cl.
USPC .......................... 382/154; 382/103; 382/284

(58) Field of Classification Search
USPC ................................................. 382/154, 103
See application file for complete search history.

(56) References Cited

U.S. PATENT DOCUMENTS

| 7,130,488 B2 * | 10/2006 | Harrington et al. | 382/284 |
| 7,136,522 B2 * | 11/2006 | Harrington et al. | 382/166 |
| 7,161,614 B1 * | 1/2007 | Yamashita et al. | 348/42 |
| 8,194,953 B2 * | 6/2012 | Xie et al. | 382/128 |
| 2003/0169918 A1 * | 9/2003 | Sogawa | 382/154 |
| 2004/0071366 A1 * | 4/2004 | Zhang et al. | 382/284 |
| 2007/0017642 A1 * | 1/2007 | Bauer et al. | 160/10 |
| 2009/0087026 A1 * | 4/2009 | Xie et al. | 382/103 |
| 2009/0128622 A1 | 5/2009 | Uchiumi et al. | |

FOREIGN PATENT DOCUMENTS

| CN | 1608385 | 4/2005 |
| CN | 101199210 | 6/2008 |
| EP | 1912446 | 4/2008 |
| EP | 1912447 | 4/2008 |
| JP | 200736528 | 2/2007 |
| WO | WO03056842 | 7/2003 |

OTHER PUBLICATIONS

Merriam-Webster Inc, "Webster's third new international dictionary principal copyright 1961", 1986, XP002515818 p. 1420, col. 1, United States of America.
Search Report Dated: Feb. 18, 2009.
Wikipedia,"Metamerism (color)", http://en.wikipedia.org/wiki/Metamerism_(color), Jun. 27. 2012, four pages.

* cited by examiner

*Primary Examiner* — Hadi Akhavannik
(74) *Attorney, Agent, or Firm* — Robert D. Shedd; Robert B. Levy

(57) ABSTRACT

A system and method for marking a stereoscopic film with colors are provided. The system and method provides for marking a left image with a mark and a right image with a mark having complementary colors, wherein upon viewing, the marks are not visible under certain conditions. The system and method provide for acquiring a stereoscopic image, the stereoscopic image including a first image and a second image, applying a first mark to the first image in a predetermined location, the first mark having a first color, and applying a second mark to the second image in substantially the same predetermined location as in the first image, the second mark having a second color that is different than the first color of the first mark, wherein when viewed in three-dimensional mode, the first mark and the second mark combine into a single mark of one color.

15 Claims, 5 Drawing Sheets

SYSTEM AND METHOD FOR MARKING A STEREOSCOPIC FILM

This application claims the benefit, under 35 U.S.C. §365 of International Application PCT/US2008/007508, filed Jun. 13, 2008, which was published in accordance with PCT Article 21(2) on Dec. 17, 2009 in English.

TECHNICAL FIELD OF THE INVENTION

The present disclosure generally relates to computer graphics processing and display systems, and more particularly, to a system and method for marking a stereoscopic film.

BACKGROUND OF THE INVENTION

Stereoscopic imaging is the process of visually combining at least two images of a scene, taken from slightly different viewpoints, to produce the illusion of three-dimensional (3D) depth. This technique relies on the fact that human eyes are spaced some distance apart and do not, therefore, view exactly the same scene. By providing each eye with an image from a different perspective, the viewer's eyes are tricked into perceiving depth. Typically, where two distinct perspectives are provided, the component images are referred to as the "left" and "right" images, also known as a reference image and complementary image, respectively. However, those skilled in the art will recognize that more than two viewpoints may be combined to form a stereoscopic image.

The transition from film to digital cinema has created new opportunities for cinema such as in 3D and real time transmission. For 3D content, it is expected that stereoscopic content will dominate digital cinema for the foreseeable future. Stereoscopic digital cinema involves projecting two images using a single projector. There are currently three techniques for projecting stereo content in digital cinema as described below:

- Use active glasses with no optical modifications: In this technique, a projector alternates left and right images on a regular screen. The user or viewer wears active glasses that is synched to the content using an IR controller.
- Use passive glasses with circular polarizer: This is currently the most widely deployed system. The projector also alternates left and right images on a sliver screen. A polarization unit is placed in front of the projector. The user or viewer is required to wear special passive glasses.
- Dolby 3D technique: In this technique, colors are divided into six bands, three for each eye. The projector alternates left and right images and the user or viewer wears a special color filtering glasses.

As described above all techniques require glasses to view the content. Without the glasses, the 3D content would look distorted.

In the cinema, it is common that a commercial advertisement, e.g., a movie preview, is typically two-dimensional (2D). Then, there is a need to let the viewers know when to wear the special glasses to realize the 3D effect. To let the viewer know when to wear the glasses, the cinema may use a curtain moving up and down, or they have to make an announcement. This becomes difficult since there is potentially many transitions from 3D to 2D and vice versa during the show or film. Therefore, a need exists for techniques to provide a transition message to a viewer of a stereoscopic film that does not provide discomfort to the viewer.

Furthermore, piracy concerns in connection with the theatrical exhibition of motion picture films are well known. Once a film distributor distributes prints of a motion picture film to exhibitors for theatrical exhibition, often a certain degree of control over the product is lost. For example, in the regular course of exhibiting the film in a theater, whether analog or digital, a customer in the theater may surreptitiously record the film using, e.g., a hand held camcorder during the exhibition. As a result, an illicit copy of relatively high quality can be made. Such illicit "pirate" copies of a movie can now be distributed over the Internet or by using hard copies (video CDs or DVDs), and this reduces the economic value of the legitimate film distribution. With the advent of the Internet and affordable higher quality recording devices, this problem has become increasingly severe in recent years. Thus, a further need exists for techniques for providing warning messages against illegal copying of films which are not visible to a legitimate viewer of the film.

SUMMARY

A system and method for marking a stereoscopic film with metameric colors are provided. The system and method provides for marking a left image with a mark of a first color and a right image with a mark having a second, different color (e.g., a complementary color), wherein upon viewing, the marks are not visible under certain conditions. When viewed in a three-dimensional (3D) mode, the marks of the left and images will combine or integrate into a single mark wherein all the pixels of the single mark are of the same color.

According to one aspect of the present disclosure, a method for marking a film is provided. The method includes acquiring (202) a stereoscopic image, the stereoscopic image including a first image and a second image, applying (204) a first mark to the first image in a predetermined location, the first mark having a first color, and applying (206) a second mark to the second image in substantially the same predetermined location as in the first image, the second mark having a second color that is different than the first color of the first mark, wherein when viewed in three-dimensional mode, the first mark and the second mark combine into a single mark of one color.

According to a further aspect of the present disclosure, a system for marking a film is provided. The system includes means for acquiring a stereoscopic image, the stereoscopic image including a first image and a second image, and a marking module configured for applying a first mark to the first image in a predetermined location, the first mark having a first color, and applying a second mark to the second image in substantially the same predetermined location as in the first image, the second mark having a second color that is different than the first color of the first mark, wherein when viewed in three-dimensional mode, the first mark and the second mark combine into a single mark of one color.

According to another aspect of the present disclosure, a stereographic image that is marked in accordance with the present disclosure is provided. The stereographic image includes a first image having a first mark in a predetermined location, the first mark having a first color, and a second image having a second mark in a substantially same location as the predetermined location in the first image, the second mark having a second color such that when the stereoscopic image is viewed as a three-dimensional image the first mark and the second mark are combined as a single mark of one color and the single mark is not viewable by a viewer of the three-dimensional image.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
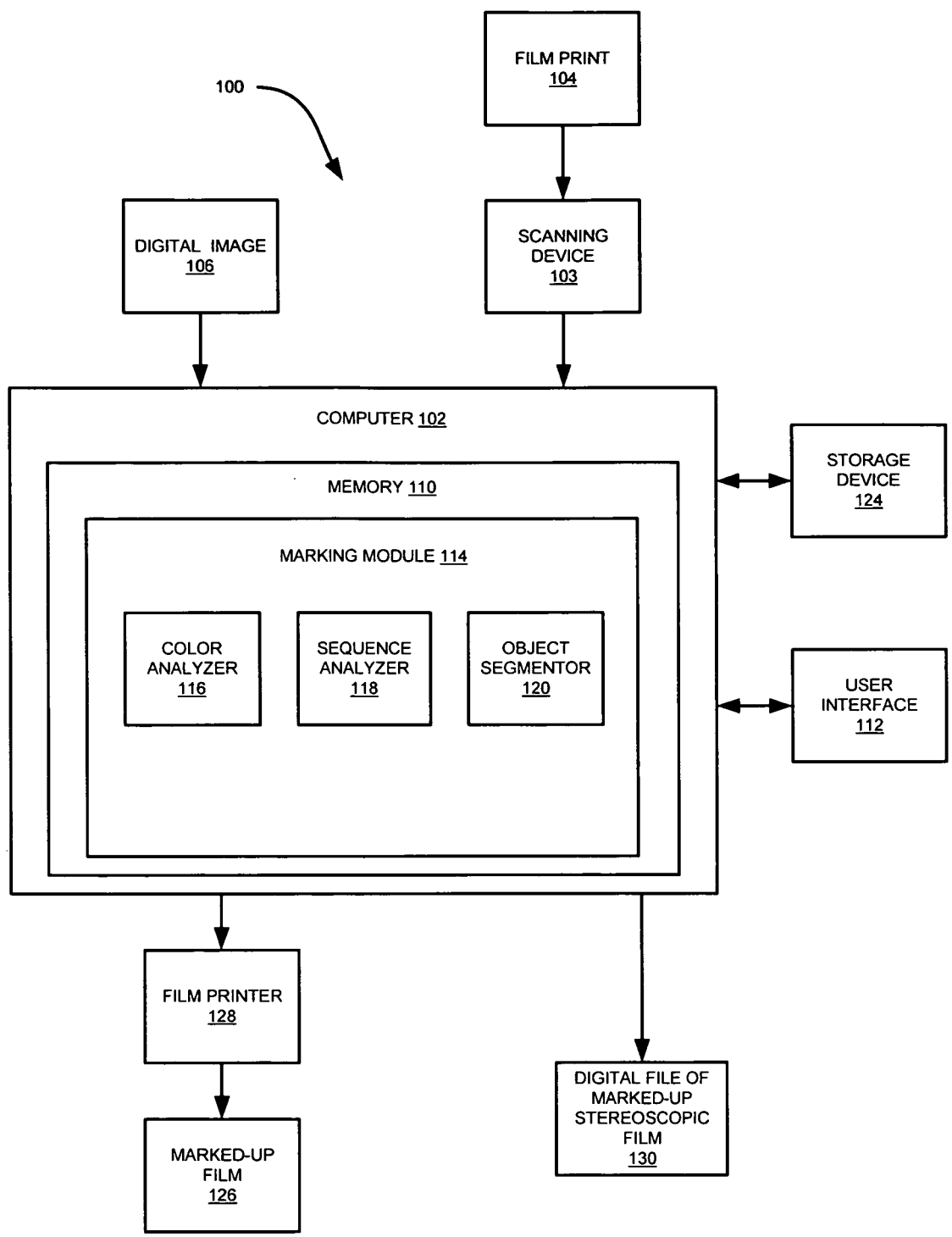
FIG. 1 is an exemplary illustration of a system for marking a stereoscopic film according to an aspect of the present disclosure.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

Stereoscopic 3D capabilities are being added to large number of theaters in the last two years. It is expected that more than 5000 would be available for stereo playback by 2009. The current stereoscopic systems available in the market require the user to wear special glasses, e.g., polarizing glasses or color selective glasses, to view 3D content. Most theaters do not employ an announcement or other mechanism during a transition time between a 2D commercial advertisement and a 3D movie to let a viewer know when to wear the special glasses. The stereoscopic information provided in the present disclosure delivers a direct visual effect, so the viewer can realize when to wear the special glasses. Assuming the same projector and glasses are employed for 2D content, such stereoscopic information can be employed as a warning message while it does not give any kind of discomfort to the viewer with the special glasses, i.e., the message is not seen by the user or viewer.

A system and method for marking a stereoscopic film with metameric colors are provided. The system and method provides for marking a left image with a first mark and a right image with a second identical mark having different colors, wherein upon viewing, the marks are not visible under certain conditions. The techniques of the present disclosure enable the placement of messages, objects, etc. in the content of a film to inform the user or viewer when the content is in 3D or 2D. This is important since the user is required to wear special glasses to view the content correctly. Thus, in 3D mode, a film or content marked in accordance with the present disclosure delivers the information of timing when the viewer should wear the special glasses for the 3D experience and, in 2D mode under the same environment, such information works as warning message against illegal recording. For example, in the case of illegal recording of 3D contents into 2D contents using special filter in front of a camcorder, such stereoscopic information will be visible and can be used as a warning message as it degrades picture quality.

Referring now to the Figures, exemplary system components according to an embodiment of the present disclosure are shown in FIG. 1. A scanning device 103 may be provided for scanning film prints 104, e.g., camera-original film negatives, into a digital format, e.g. Cineon-format or Society of Motion Picture and Television Engineers ("SMPTE") Digital Picture Exchange ("DPX") files. The scanning device 103 may comprise, e.g., a telecine or any device that will generate a video output from film such as, e.g., an Arri LocPro™ with video output. Alternatively, files from the post production process or digital cinema 106 (e.g., files already in computer-readable form) can be used directly. Potential sources of computer-readable files are AVID™ editors, DPX files, D5 tapes etc.

Scanned film prints are input to a post-processing device 102, e.g., a computer. The computer is implemented on any of the various known computer platforms having hardware such as one or more central processing units (CPU), memory 110 such as random access memory (RAM) and/or read only memory (ROM) and input/output (I/O) user interface(s) 112 such as a keyboard, cursor control device (e.g., a mouse or joystick) and display device. The computer platform also includes an operating system and micro instruction code. The various processes and functions described herein may either be part of the micro instruction code or part of a software application program (or a combination thereof) which is executed via the operating system. In one embodiment, the software application program is tangibly embodied on a program storage device, which may be uploaded to and executed by any suitable machine such as post-processing device 102. In addition, various other peripheral devices may be connected to the computer platform by various interfaces and bus structures, such a parallel port, serial port or universal serial bus (USB). Other peripheral devices may include additional storage devices 124 and a printer 128. The printer 128 may be employed for printing a revised version of the film 126, e.g., a stereoscopic marked-up version of the film, wherein a scene or a plurality of scenes may have been altered or marked-up using the techniques described below.

Alternatively, files/film prints already in computer-readable form 106 (e.g., digital cinema, which for example, may be stored on external hard drive 124) may be directly input into the computer 102. Note that the term "film" used herein may refer to either film prints or digital cinema.

A software program includes a marking module 114 stored in the memory 110 for marking each image of a stereoscopic pair with a mark such as a text message, an object, a logo, etc. The marking module 114 will mark a first or left eye view image of a stereoscopic pair with a first mark having at least two colors and mark a second or right eye view image (i.e., a complementary image) with an identical second mark having at least two different colors, e.g., complementary colors. The colors of the first mark and the second mark are considered metameric colors since when the two images are viewed during playback with special 3D glasses, the first and second marks will combine or integrate into one color and not be visible to a viewer.

The marking module 114 includes a color analyzer 116 configured to select the at least two colors of the first mark and to determine the at least two different colors of the second mark. The color analyzer 116 is further configured for determining at least one color in the first or second image and spectrally dividing the at least one color into at least two metameric colors.

The marking module 114 further includes a sequence analyzer 118 for determining or selecting a number of consecutives frames of a stereoscopic pair that belong to the same scene or shot. The sequence analyzer 118 will determine if at least one condition is satisfied for a location in an image within at least two consecutive frames. For example, if a mark is to be placed in an image with other content, the sequence analyzer 118 will determined if a location selected for the mark has changed and therefore, the mark will become obtrusive to the viewer.

In one embodiment, the marking module 114 will include an object segmentor 120 for segmenting objects from an image. The object segmentor 120 will identify objects in an image and, in conjunction with the color analyzer 116, will determine the color of the object and if it is a suitable object for marking. The color analyzer 116 may then spectrally divide the determined color to select metameric colors for the mark.

Figure 2:
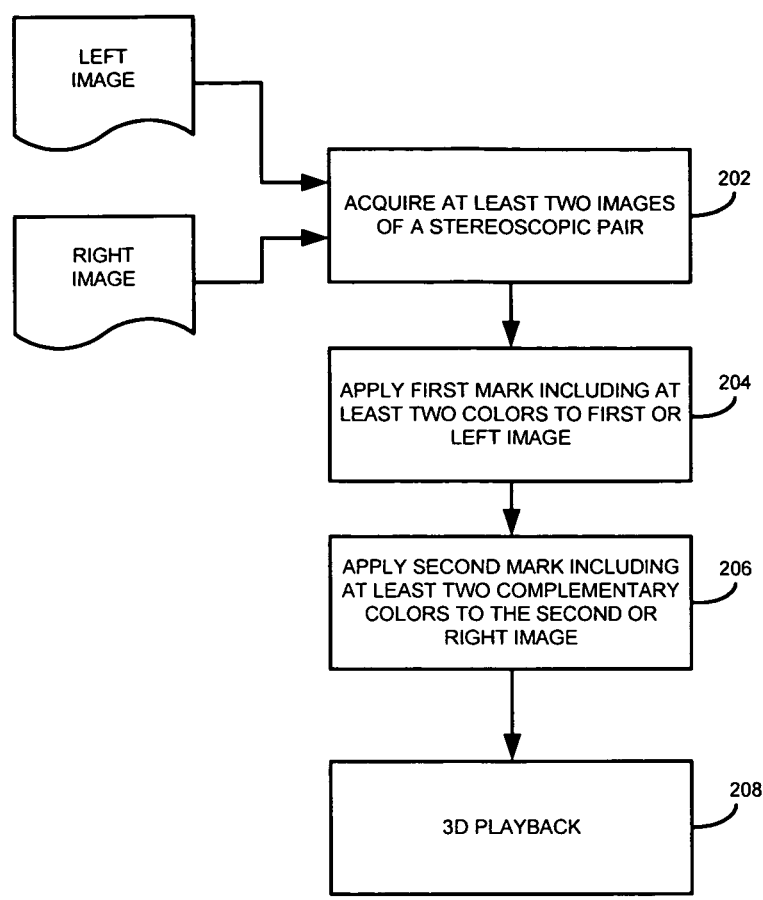
FIG. 2 is a flow diagram of an exemplary method for marking a stereoscopic film according to an aspect of the present disclosure.

FIG. 2 is a flow diagram of an exemplary method for marking of at least two two-dimensional (2D) images of a stereoscopic pair according to an aspect of the present disclosure. Initially, at step 202, the post-processing device 102 acquires at least two two-dimensional (2D) images, e.g., a stereo image pair with left and right eye views. The post-processing device 102 may acquire the at least two 2D images by obtaining the digital master image file in a computer-readable format. The digital video file may be acquired by capturing a temporal sequence of moving images with a digital camera. Alternatively, the video sequence may be captured by a conventional film-type camera. In this scenario, the film is scanned via scanning device 103.

It is to be appreciated that whether the film is scanned or already in digital format, the digital file of the film will include indications or information on locations of the frames, e.g., a frame number, time from start of the film, etc. Each frame of the digital image file will include one image, e.g., $I_1$, $I_2$, ... $I_n$.

Figure 3:
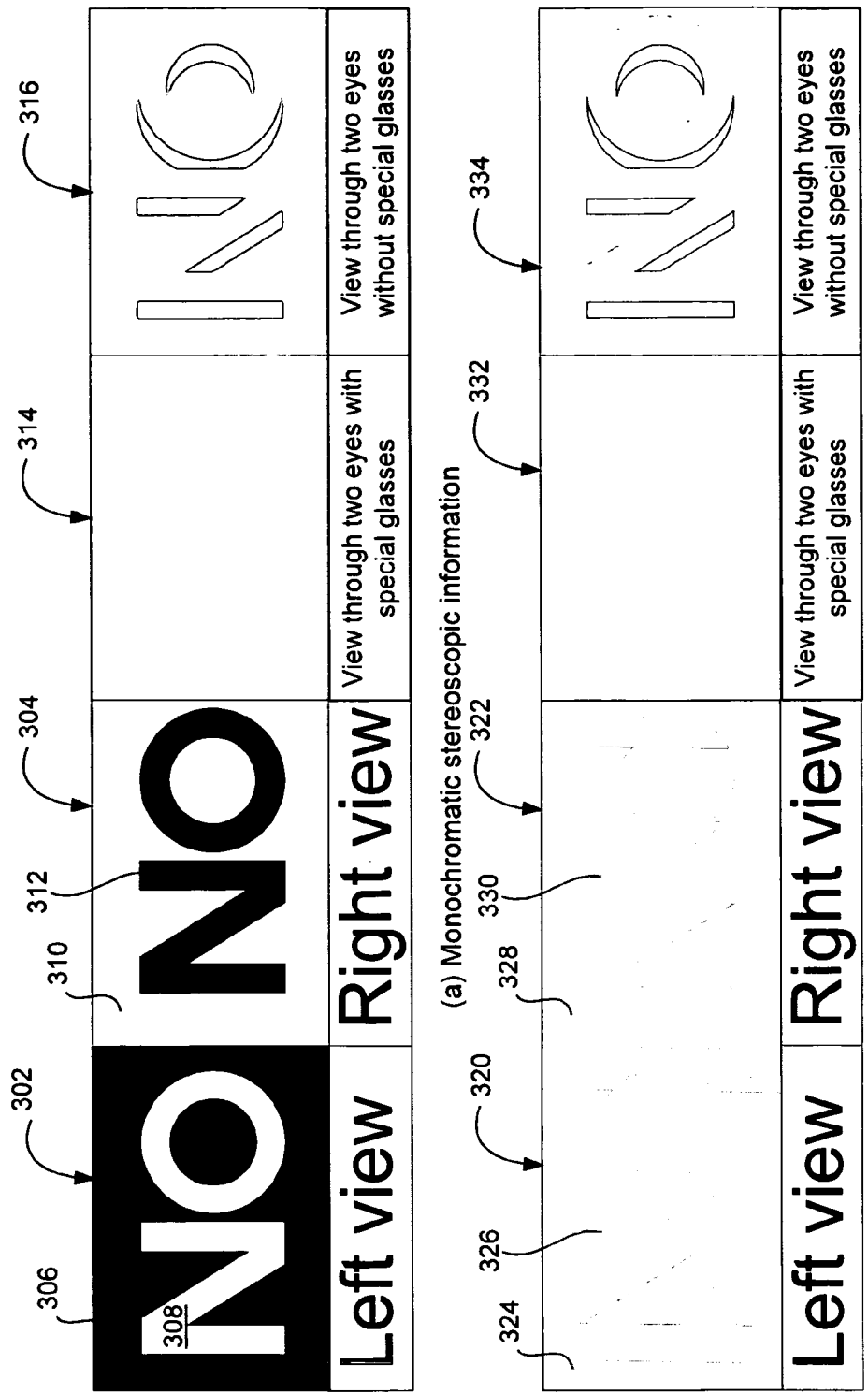
FIG. 3 illustrates a left view and right view image of a stereoscopic pair, a resultant view as seen by a viewer wearing special 3D glasses and a resultant view as seen by a viewer not wearing special 3D glasses.

Referring to FIG. 3, a left view image 302 and right view image 304 are shown. In exemplary illustration shown in FIG. 3, the images are marked with a text message; here, for simplicity a text message of "NO". In the context of a transition for a 3D film, the message might read "3D Movie Start", "Put On Glasses" or the like.

Referring now to FIGS. 2 and 3, in step 204, the mark is applied to the first or left image where the mark includes at least two colors. In left view image 302, the background 306 of the image is selected to be black and the text 308 is selected to be white. In step 206, a second, identical mark is applied to the second or right view image 304. In the second or right view image 304, the background 310 of the image is selected to be white, for example, the complementary color of the background of image 302, and the text 312 is selected to be black, for example, the complementary color of the text of image 302. It is to be appreciated that in this example the mark is the whole image. It is further to be appreciated that marks of complementary colors are just one example and any combination of two or more colors resulting in a single mark wherein all the pixels of the mark combine into one color are in accordance with the teachings of the present disclosure. The mark or text may be applied to several consecutive frames or for a predetermined period of time for example at the beginning of a film or movie. It should be noted that although using a mark that has at least two colors in the first image and using a mark having at least two complementary colors in the second image, as described above, is preferable when the mark is textual, using a mark that has only one color in the first image and a mark having a complementary color in the second image is also within the scope of the present disclosure as understood by those skilled in the art. Marks having only one color (i.e., a first color and a complementary color) may be used, for example, when the mark is, but is not limited to, an object, logo, geometric shape or the like.

In step 208, the marked-up stereoscopic film is played back or shown to a viewer. Image 314 illustrates a resultant view as seen by a viewer wearing special 3D glasses and image 316 illustrates a resultant view as seen by a viewer not wearing special 3D glasses. As can be seen in image 316, the mark, or message, will be presented to the viewer before the viewer begins to wear the 3D glasses due to the depth between the left view image 302 and right view image 304. In image 314, since the colors of both image 302 and image 304 are selected to be metameric and the images align with the use of the glasses, the colors of the marks combine to from a single color and the mark, i.e., text message, no longer appears to the viewer. In this example, the image 314 will appear grey.

It is to be appreciated that although the example described in relation to FIG. 3(a) employed monochromatic stereoscopic information, i.e., black and white, chromatic stereoscopic information may be employed as shown in FIG. 3(b). Although colors will be described, the images of FIG. 3(b) are presented in grey scale, black and white; the colors will be described and represented in FIG. 3(b) with reference numerals. In this example, in image 320, the background 324 of the image is selected to be red and the text 326 is selected to be green. In the second or right view image 322, the background 328 of the image is selected to be green, i.e., a metameric color of the background of image 320, and the text 330 is selected to be red, i.e., a metameric color of the text of image 320. As can be seen in image 334, the mark, or text, will be visible without the use of 3D glasses; however, with the 3D glasses, image 332 appears to be solid or have no mark. In this example, image 332 will appear yellow to the viewer due to the combining of the red and green colors.

In a further embodiment, the system and method of the present disclosure will mark a film for anti-piracy purposes. In pirating or copying a film, a copier may put a special filter in front of a camcorder while the 3D contents are running. In another words, the camcorder is capturing only one view as a 2D version of the film. In this case, a mark or message applied to the film will appear in the picture because the camcorder has only a single aperture, so integration of the left and right images will not be possible. It is to be appreciated that for anti-piracy purposes a mark or several marks should be applied throughout the film to degrade the copied version and not just at the beginning of the film. It is to be further appreciated the mark may take the form of a warning message or a mark on an object to obscure proper viewing.

Figure 4:
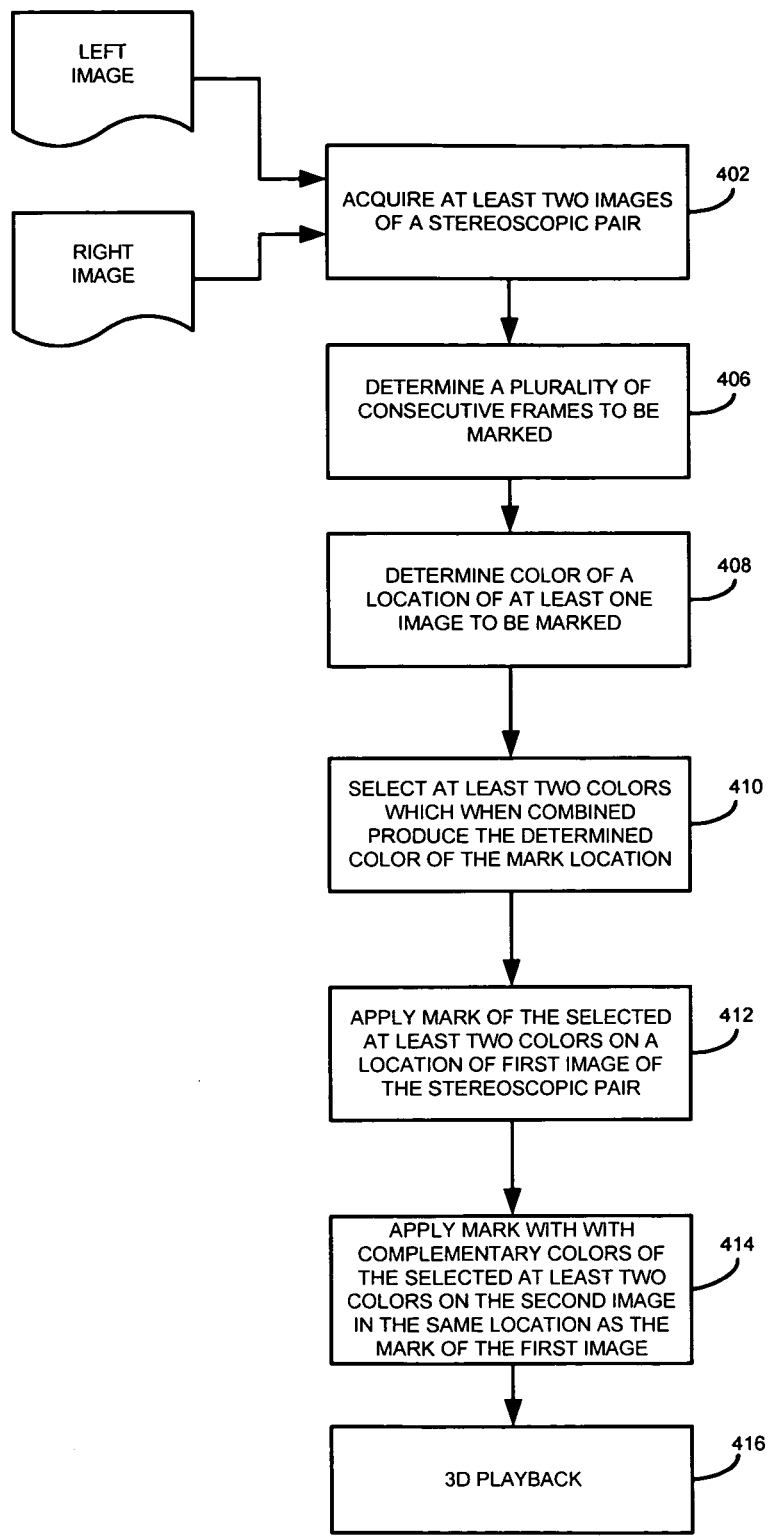
FIG. 4 is a flow diagram of another exemplary method for marking a stereoscopic film according to an aspect of the present disclosure.
Figure 5:
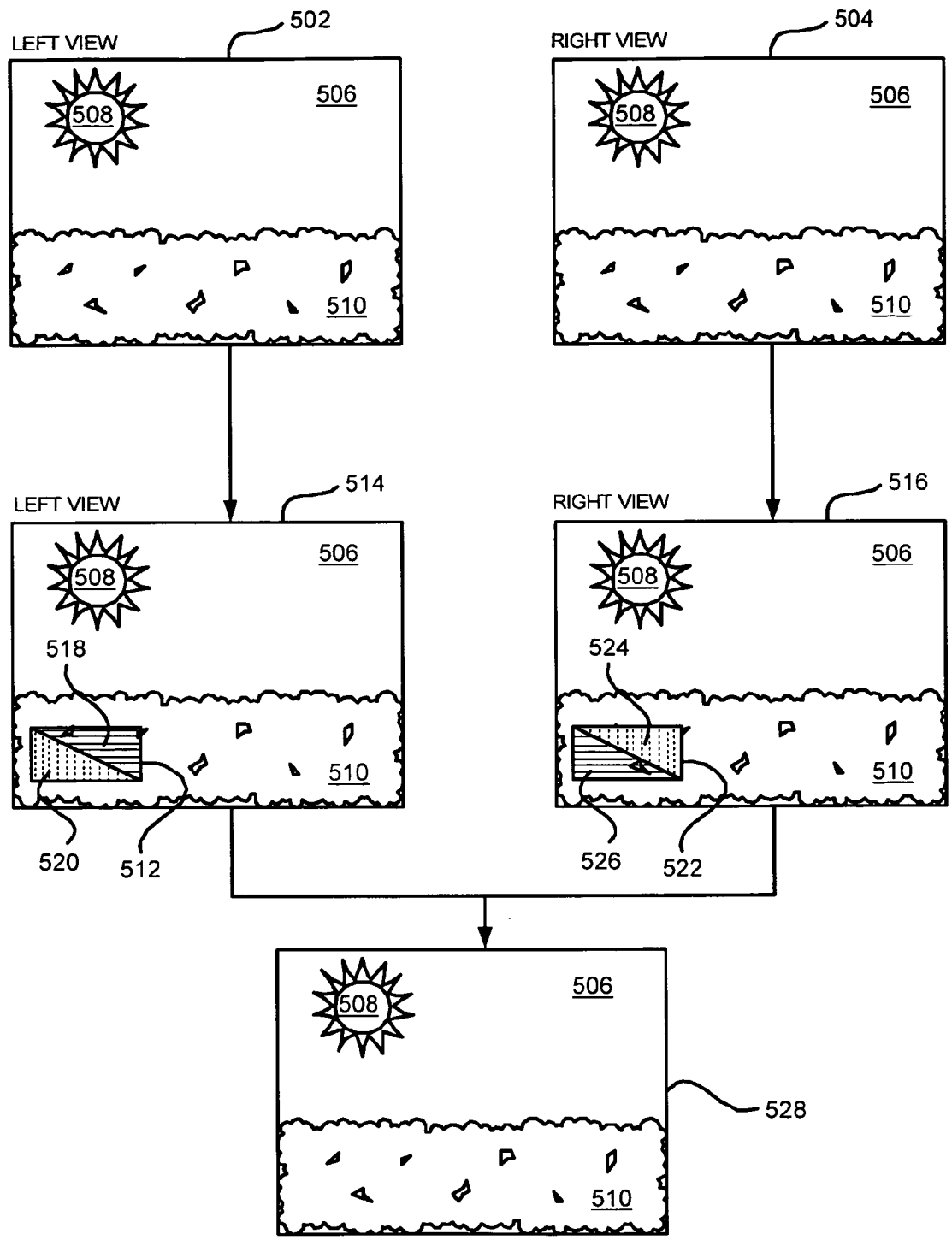
FIG. 5 illustrates a flow diagram of marking a stereoscopic pair of images for anti-piracy.

Referring to FIGS. 4 and 5, the post-processing device 102 acquires at least two two-dimensional (2D) images 502, 504, e.g., a stereo image pair with left and right eye views (step 402), as described above. In this embodiment, the mark will most likely be applied in an image having some other content. Therefore, a suitable location needs to be determined for the mark to not obscure the content. Furthermore, due to changing scenes and shots, the mark will most likely have to be moved or relocated throughout the film.

In step 406, the sequence analyzer 118 will determine a plurality of consecutive frames of a sequence to be marked. The consecutive frames may be frames from a single shot or scene or a plurality of frames having a common object. Optionally, the object segmentor 120 will segment objects from at least one image of the stereoscopic pair. This object may then be used by the sequence analyzer 118 to determine the number of consecutive frames of the scene. The object may then be selected as the location for the mark for the particular sequence. In this manner, the color of the object may be used to select the colors of the mark so when viewed during playback the mark will not appear to the viewer.

In step 408, the color analyzer 116 will determine the color of the location of the image to be marked or the color of the object to be marked. For example, in images 502 and 504 of FIG. 5, it may be determined that sky 506 is blue, sun 508 is yellow and grass 510 is green. In this example, mark 512 is selected to be placed in the grass section of the image. The selection of the location of the mark 512 may be manual or may be determined automatically by post-processing device 102 based on a color of an object that has been segmented.

In step 410, at least two colors are selected for the mark which when combined will produce the color of the location of the mark. In the illustrative example described, since the mark 512 is located on green, the two colors selected will be blue and yellow. It is to be appreciated that more than two colors can be selected and combined to produce the color of the location of the mark. In one embodiment, the color analyzer 116 will spectrally divide the color of the location of the mark to determine the at least two colors of the mark.

Next, in step 412, the mark 512 is applied to first or left view image 514. The mark 512 can take any form and have several components or portions each having a color. For simplicity, the mark 512 is divided into two portions each having a color. Here, mark 512 includes a first portion 518, the first portion colored blue. The mark 512 includes a second portion 520, the second portion colored yellow. In step 414, a second identical mark 522 is applied to the second or right view image 516 in substantially the same location as mark 512 was applied to image 514. Mark 522 is then constructed with different colors (e.g., opponent colors) of the colors of the first and second portions of mark 512. Here, mark 522 includes a yellow, first portion 524 and a blue, second portion 526. It is to be appreciated that the marks may be applied to each frame of the sequence or to a portion of the plurality of successive frames of the sequence.

The marked-up images are stored, e.g., in storage device 124, and may be retrieved for 3D playback (step 416). Furthermore, all images of a motion picture or video clip can be stored in a single digital file 130 representing a marked-up stereoscopic version of the motion picture or clip. The digital file 130 may be stored in storage device 124 for later retrieval, e.g., to print a stereoscopic version of the original film 126 via film printer 128.

During 3D playback, in step 416, the viewer wearing 3D glasses will see a 3D image 528 as an integration of images 514 and 516. In this integration, first mark 512 and second mark 522 will overlap and the colors of each portion will combine to produce a visible single color, here, green, for all the pixels of the integrated mark. In this example, the first blue portion 518 of mark 512 will combine with first yellow portion 524 of mark 522 and the second yellow portion 520 of mark 512 will combine with second blue portion 526 of mark 522. When viewed with 3D glasses, the resultant image 528 will not show the mark, i.e., a viewer of the 3D image 528 will not be able to view the combined or integrated mark. However, if the film was copied using a camcorder with a filter, only one view of images is recorded during the copying process, for example, the left view images, and therefore, during playback, mark 512 will be visible and will degrade the quality of the copied film. It is to be appreciated that more than one mark can be applied to any image thus creating a plurality of marks visible in pirated copies thus degrading the quality of the copied film. It is further to be appreciated that marks may be placed on every frame of the film further degrading the viewability of the copied film.

Although embodiments which incorporate the teachings of the present disclosure have been shown and described in detail herein, those skilled in the art can readily devise many other varied embodiments that still incorporate these teachings. Having described preferred embodiments for a system and method for marking a film with colors (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method for marking, the method comprising the steps of:
   acquiring a stereoscopic image, the stereoscopic image including a first image and a second image;
   applying a first mark to the first image in a predetermined location, the first mark having a first color; and
   applying a second mark to the second image in substantially the same predetermined location as in the first image, the
   wherein the color of the first mark and the second color of the second mark are selected as metameric colors of the color of the predetermined location in the first image; and
   wherein when viewed in three-dimensional mode, the first mark and the second mark combine into a single mark of one color and the single mark is not viewable by a viewer of the three-dimensional image.

2. The method of claim 1, wherein the first and second marks are at least one of a text message, object and logo.

3. The method of claim 1, wherein the stereoscopic image is a stereoscopic scene including a sequence of successive frames of first and second images; and wherein the steps of applying the first and second marks includes applying the first and second marks to each frame of the sequence.

4. The method of claim 1, wherein the stereoscopic image is a stereoscopic scene including a sequence of successive frames of first and second images; and wherein the steps of applying the first and second marks includes applying the first and second marks to a portion of the plurality of successive frames of the sequence.

5. The method of claim 1, wherein the first and second images include a left eye view and a right eye view of the stereoscopic image.

6. The method of claim 1, further comprising the steps of: segmenting an object from the first and second image; and applying the first and second marks to the object.

7. The method of claim 1, wherein the colors of the first mark and the second mark are at least one of monochromatic and chromatic.

8. A system for marking a film comprising:
   means for acquiring a stereoscopic image, the stereoscopic image including a first image and a second image; and
   a marking module configured for applying a first mark to the first image in a predetermined location, the first mark having a first color, and applying a second mark to the second image in substantially the same predetermined location as in the first image,
   wherein the color of the first mark and the second color of the second mark are selected as metameric colors of the color of the predetermined location in the first image; and wherein when viewed in three-dimensional mode, the first mark and the second mark combine into a single mark of one color and the single mark is not viewable by a viewer of the three-dimensional image.

9. The system of claim 8, wherein the first and second marks are at least one of a text message, object and logo.

10. The system of claim 8, wherein the stereoscopic image is a stereoscopic scene including a sequence of successive frames of first and second images and further comprising a sequence analyzer for selecting a plurality of consecutive frames of the sequence to be marked.

11. The system of claim 10, wherein the marking module is further configured to apply the first and second marks to each frame of the selected sequence.

12. The system of claim 10, wherein the marking module is further configured to apply the first and second marks to a portion of the plurality of successive frames of the sequence.

13. The system of claim 8, wherein the first and second images include a left eye view and a right eye view of the stereoscopic image.

14. The system of claim 8, further comprising an object segmentor for segmenting an object from the first image and the marking module is further configured to apply the first and second marks to the object in the first and second images.

15. The system of claim 8, wherein the colors of the first mark and the second mark are at least one of monochromatic and chromatic.

* * * * *